United States Patent [19]

Takahashi et al.

[11] 4,419,738
[45] Dec. 6, 1983

[54] UNIT-PRICE PRESETTING METHOD FOR ELECTRONIC CASH REGISTERS

[75] Inventors: Yasuyoshi Takahashi; Shigeo Sakiguchi; Teruyoshi Sato, all of Shizuoka, Japan

[73] Assignee: Tokyo Electric Co., Ltd., Tokyo, Japan

[21] Appl. No.: 318,815

[22] Filed: Nov. 6, 1981

Related U.S. Application Data

[63] Continuation of Ser. No. 96,197, Nov. 20, 1979, abandoned, which is a continuation of Ser. No. 807,304, Jun. 16, 1977, abandoned.

[30] Foreign Application Priority Data

Jun. 16, 1976 [JP] Japan ............................. 51-70788
Jun. 16, 1976 [JP] Japan ............................. 51-70789

[51] Int. Cl.³ ............................................ G06F 15/20
[52] U.S. Cl. ...................................... 364/900; 364/405
[58] Field of Search ................... 364/200, 900, 405

[56] References Cited

U.S. PATENT DOCUMENTS

| | | | |
|---|---|---|---|
| 3,294,960 | 12/1966 | Townsend | 364/405 X |
| 3,403,225 | 9/1968 | Mislan et al. | 364/900 |
| 3,631,403 | 12/1971 | Asbo et al. | 364/200 |
| 3,686,637 | 8/1972 | Zachar | 364/200 |
| 3,710,085 | 1/1973 | Brewer | 364/404 |
| 3,789,193 | 1/1974 | Bremmer | 235/449 |
| 3,866,175 | 2/1975 | Selfert | 340/152 R |
| 3,946,220 | 3/1976 | Brobeck et al. | 364/405 |
| 3,983,577 | 9/1976 | Ito et al. | 364/900 |

FOREIGN PATENT DOCUMENTS 2333908 7/1972 Fed. Rep. of Germany .

Primary Examiner—Raulfe B. Zache
Attorney, Agent, or Firm—Oblon, Fisher, Spivak, McClelland & Maier

[57] ABSTRACT

A unit-price presetting method for a plurality of electronic cash registers each equipped with a built-in memory and provided independently of one another, in which the unit price for each commodity code is stored in a portable memory unit by the use of one electronic cash register and in which the portable memory unit is used to store the data of the same contents in all of the other electronic cash registers.

2 Claims, 7 Drawing Figures

| Address n | Goode Code a | Unit Price | Address m | Goode Code b | Unit Price | Quantity | Account |
|---|---|---|---|---|---|---|---|
| 001 | 111 | 100 | 001 | 111 | 100 | | |
| 002 | 112 | 200 | 002 | 112 | 200 | | |
| 003 | 113 | 300 | 003 | 113 | 300 | | |
| | | | | | | | |
| | | | | | | | |
| | | | | | | | |
| | | | | | | | |

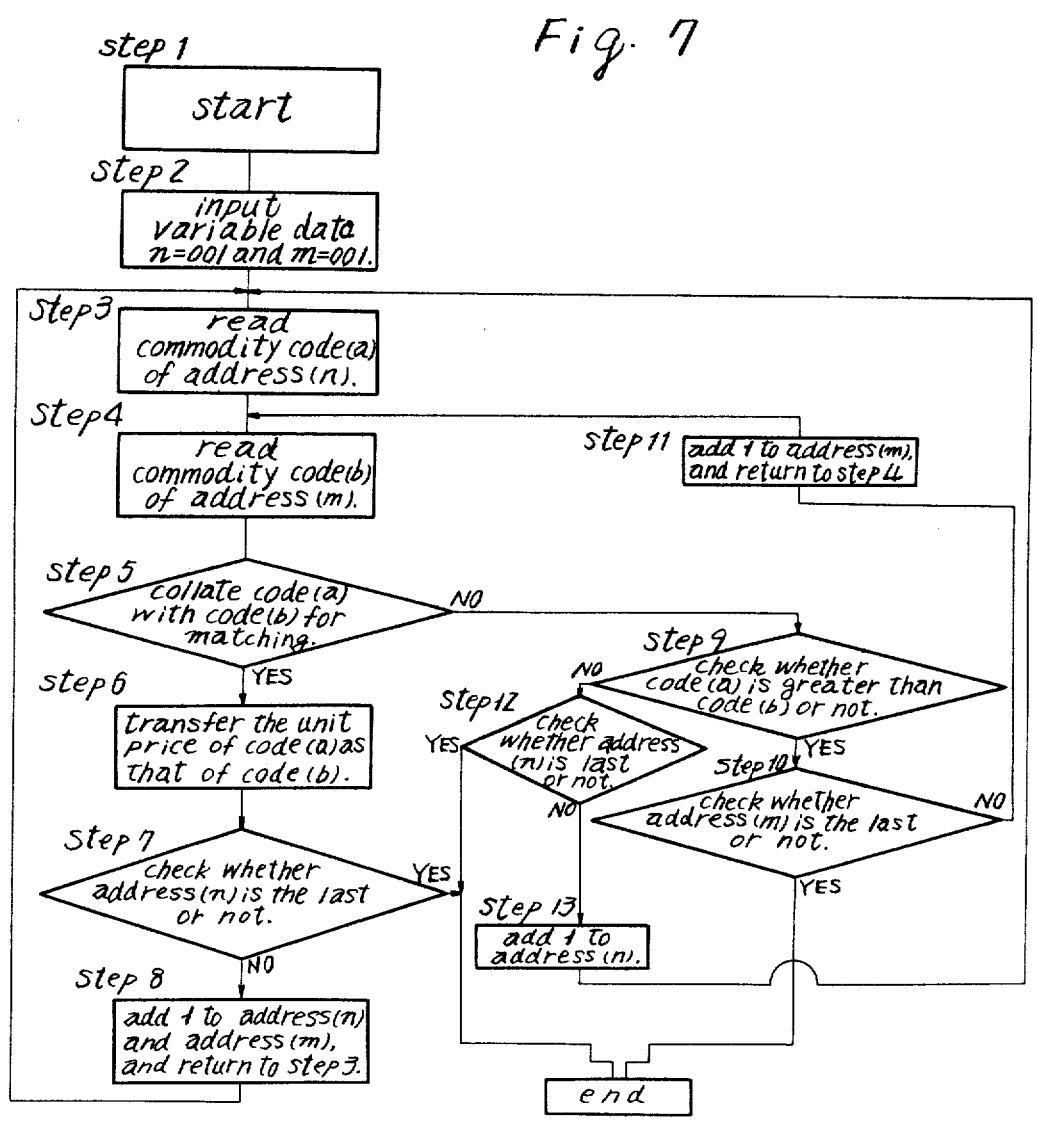

UNIT-PRICE PRESETTING METHOD FOR ELECTRONIC CASH REGISTERS

This is a continuation of application Ser. No. 096,197 filed Nov. 20, 1979, now abandoned, which is a continuation of abandoned application Ser. No. 807,304, filed June 16, 1977.

BACKGROUND OF THE INVENTION

The present invention relates to a unit-price presetting method for electronic cash registers and, more particularly, to a unit-price presetting method for electronic cash registers that can preset the same unit-price data easily and rapidly in a plurality of electronic cash registers provided electrically independently of one another.

In registering the sale proceeds, it is heretofore a usual but troublesome practice liable to error to depress amount keys equivalent to numeral keys every time a commodity or article is sold, to depress a multiplication key and numeral keys if a plurality of commodities or articles are sold, and to depress commodity or article keys or department keys. Accordingly, some of the cash registers equipped with unit-price memories are so constructed that the unit price of each commodity or article may be preset in the memory and thereby registration may be made by depressing only the commodity key corresponding to the commodity sold; in this case, the unit price of each commodity or article is preset by depressing the amount keys equivalent to numeral keys and then by depressing the commodity key, and the data once preset are kept stored in the memory unless they are intentionally erased. In the above registers, the unit price of the commodities stable in price such as medicines can be used for a long time if once preset, however the unit price of the commodities such as perishable foodstuffs subject to daily unit-price change must be preset in each memory everyday before the office is opened with the result that the unit-price presetting time is increased. In addition, there are many other factors which cause price changes; for instance, the unit price must be changed when goods are purchased on the judgement of the branch office itself in addition to on the basis of the instructions from the head office (control center, etc.), when goods are for sale at a discount or at a special price, when goods left unsold are for sale at a discount, when goods on sale at a discount are returned to the normal price, and when the branch office itself judged it necessary to adopt a strategic price in rivalry with other dealers in the same commercial district. Thus the frequency of unit-price presetting is very high, and accordingly the frequencies of input errors and troublesome checking are so much increased.

Besides, there is also provided a system in which each register is connected to a computer or the like installed at the control center so that the unit-price presetting operation for each register may be omitted. However, this system is large-scale and very expensive, being not suitable for small-scale operations such as unit-price presetting for each register at each branch or each shop; thus, in the case of commodities liable to price change must be preset by operating the keyboard of each register after all.

BRIEF SUMMARY OF THE INVENTION

It is an object of the present invention to provide a unit-price presetting method for electronic cash registers which can store the same data in a plurality of electronic cash registers even if they are provided electrically independently of one another.

It is another object of the present invention to provide a unit-price presetting method for electronic cash registers which, by the use of a portable memory unit, requires only one unit-price presetting operation, eliminating the need for other unit-price presetting operations for the individual electronic cash registers.

According to the present invention, there is provided a unit-price presetting method for a plurality of electronic cash registers each equipped with a built-in memory, which comprises the steps of presetting unit-price data for each commodity code into the above memory of at least one of the electronic cash registers, storing the above unit-price data in a portable memory unit, and connecting the portable memory unit to the others of the electronic cash registers one by one so that the above unit-price data may be stored in the memories thereof.

BRIEF DESCRIPTION OF THE DRAWINGS

FIG. 5 is a plan view of a keyboard according to the embodiment shown in FIG. 4;

FIG. 6 is an explanatory view of the data to be transferred; and

FIG. 7 is a flowchart showing how the data are transferred.

DESCRIPTION OF THE PREFERRED EMBODIMENTS

Figure 1:
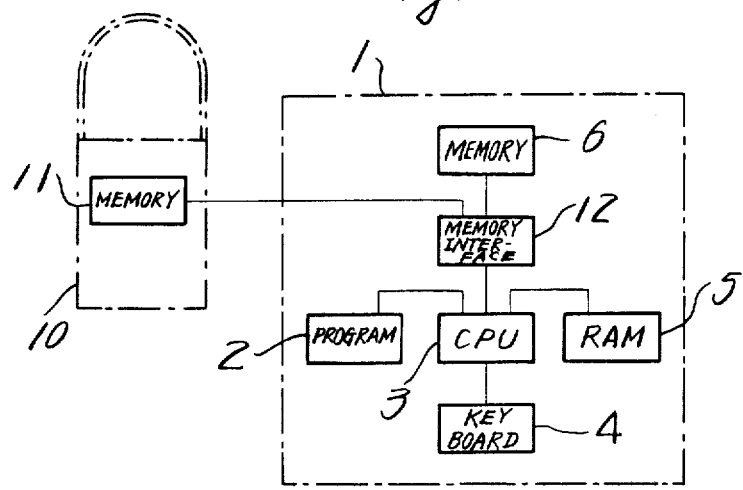
FIG. 1 is a block diagram according to one embodiment of the present invention, showing how a unit price is preset in the built-in memory and the portable memory unit.
Figure 2:
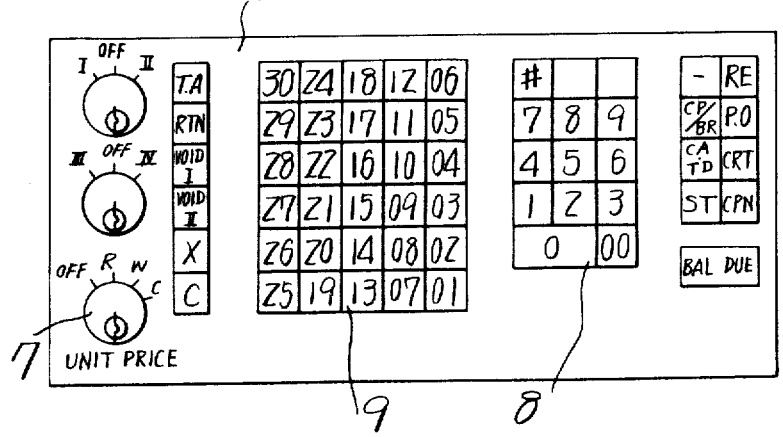
FIG. 2 is a plan view of a keyboard for use in unit-price presetting.
Figure 3:
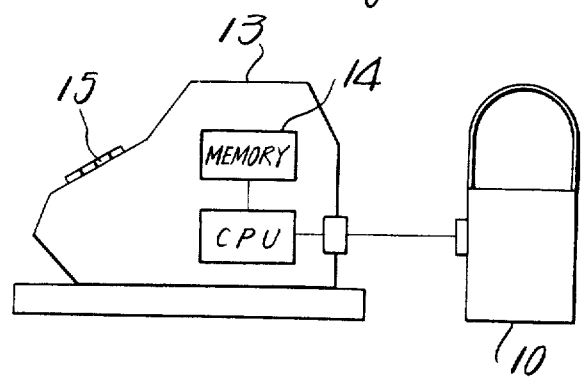
FIG. 3 is an explanatory view showing how the data in the portable memory unit is transferred to each electronic cash register.
Figure 4:
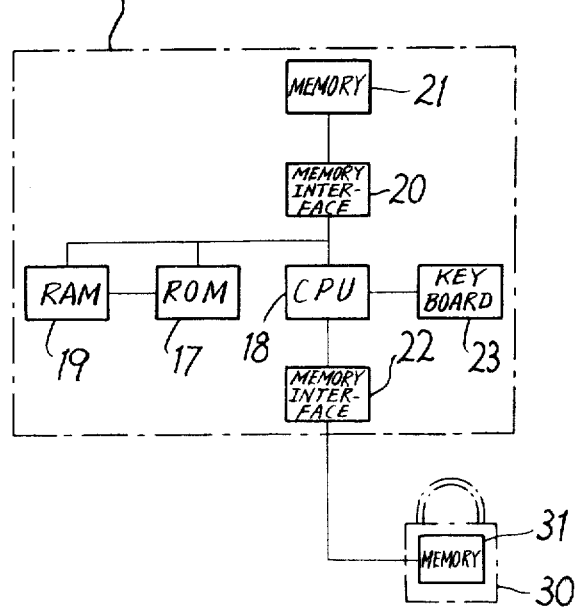
FIG. 4 is a block diagram according to another embodiment of the present invention, showing how the portable memory unit is connected to the electronic cash register.

One embodiment of the present invention will be hereinafter described with reference to FIGS. 1, 2 and 3.

Reference numeral 1 designates the register proper of an electronic cash register. The register proper 1 is provided with a program 2, a central processing unit (CPU) 8 for controlling the program 2, a keyboard 4, a random access memory (RAM) 5 for temporarily storing the results of registration and operation, and a memory 6 for storing unit prices. The keyboard 4 has a unit-price setting key 7, ten quantity keys 8 and commodity keys 9. A memory interface 12 is provided between the CPU 3 and the memory 6 so as to connect the CPU 5 both with the memory 6 and with a memory 11 installed in a portable memory unit 10.

In operation, the memory 11 of the portable memory unit 10 is connected to the memory interface 12. Then, a preset key (not shown) is inserted in the unit-price setting key 7 to rotate or set it to Position W. Then the ten quantity key 8 is depressed to input the unit price, and the commodity key 9 is depressed for each commodity code. In this manner, the commodity unit-price data of the same contents are preset in the built-in memory 6 and the memory 11 of the memory unit 11. The memory 11 is then disconnected from the memory interface 12, and is connected to the other electronic cash registers 3 one by one for transfer operation; thus the data preset in the memory 11 of the portable memory unit 10 is transferred to the memory 6 of each other electronic cash register designated 13 in FIG. 3. In each electronic cash register, therefore, the unit price stored in the memory 6 are read only by depressing the commodity key on the keyboard 4 and thereby the sale proceeds and commodity code are registered. It is as a matter of course that, in the original electronic register in which the unit price is first preset, the sale proceeds and commodity code can be registered only by depressing the commodity key 9 if the change-over switch (not shown) is previously set to "Registration," since the unit price is already preset in the memory 6.

According to the present invention, as mentioned above, when once the unit price data are preset in the memory 11 of the portable memory unit 10, unit-price presetting for each register can be performed only by transferring the unit price data in the memory 11 to the memory 6 of each other register 13; in the unit-price presetting, therefore, the operation to depress the ten quantity keys 8 and commodity key 9 for each commodity are performed only for one electronic cash register; thus presetting-time decrease and labor saving can be achieved.

In order to store the unit price data in the portable memory unit 10, the unit price may be previously preset in the memory 6 of the register proper 1 of one electronic cash register, and then the portable memory unit 10 may be connected to the memory 6 so that the data in the memory 6 can be transferred to the memory 11. The commodity keys 9 may be of any type if suitable, as a matter of course. For further information concerning tape interface circuitry, and data format and processing circuitry, reference is made to U.S. Pat. No. 3,403,225 and U.S. Pat. No. 3,983,577.

Another preferred embodiment of the present invention will be hereinafter described with reference to FIGS. 4 to 7.

Reference numeral 16 designates the register proper of an electronic cash register. The register proper 16 is provided with a fixed memory or read only member (ROM) 17 containing a program, a central processing unit (CPU) 18 for controlling the program, a random access memory (RAM) 19 for temporarily storing the results of registration and operation, a memory 21 connected to the CPU 18 through a memory interface 20, another memory interface 22 connected to the CPU 18, and a keyboard 23. The keyboard 23 is provided with a unit-price setting key 24, ten quantity keys 25, commodity keys 26, a transfer key 27, and a start switch 28. The transfer key 27 has a mode 29 "Transfer". The above start switch 28 is provided in a circuit which is closed when the transfer key 27 is set to the mode 29. The memory 21 of the register proper 16 stores the commodity code (b) in the order of the address (m).

A portable memory unit 30 has a memory 31, which is removably connected to the memory interface 22. The commodity code (a) and unit prices are preset in the memory 31 in the order of the address (n); presetting these data may be achieved by previously connecting a computer or an electronic register provided with presetting function, as in the foregoing embodiment, to the memory 31 and then by performing the unit-price presetting operation by the use of the computer or the electronic register. The addresses (n) and (m) are arranged in a numerically ascending order.

In operation, the memory 31 of the portable memory unit 30 is connected to the memory interface 22 of the register proper 16, and a key (not shown) is inserted in the transfer key 27 to set it to the mode 29 "Transfer." Then the start switch 28 is turned on to transfer the unit price for each commodity code number, which is preset in the memory 31 of the memory unit 30, in the order of the address. The transfer process is shown by the flowchart in FIG. 7. In FIG. 7, the start switch is first operated (Step 1), and thereby the memory 31 generates a signal of "Address n=001" and the memory 21 generates a signal of "Address m=001" (Step 2). Then the "commodity code (a)=111" corresponding to the "address n=001" is read (Step 3), and the "commodity code (b)=111" corresponding to the "address m =001" is read (Step 4). Then the commodity code (a) is collated with the commodity code (b) to check whether or not they coincide with each other (Step 5). If they coincide with each other, a signal "YES" is generated to transfer the unit price in the memory 31 to the memory 21 (Step 6). Then examined is whether or not the address "address n=001" is the last (Step 7); if it is not the last, a signal "NO" is generated to add 1 to the addresses n and m (Step 8) thereby giving the "address n=002 " and "address m=002." Then, read are the "commodity code (a)=112" and "commodity code (b) =112" corresponding to the "address n=002" and "address m=002," respectively; and the process is returned to Step 3. These operations are repeatedly performed so that the unit price for each commodity code number may be transferred from the memory 31 to the memory 21 in the order of the address n or m. If the data to be transferred run short, that is, if the address n is the last, a signal "YES" is generated to end the transfer operation (Step 7). Meanwhile, the unit price is not necessarily transferred to all the commodity codes (a) and (b) in the memory 21; in addition, the commodity codes (a) and (b) are sometimes misarranged. For this reason, the commodity code (a) in the memory 31 is sometimes greater than the commmodity code (b) in the memory 21 (Step 9), though the unit price is transferred in the order of the address n; in this case, it is first examined whether or not the address m of the commodity code (a) is the last (Step 10); if the address m is the last, a signal "YES" is generated to end the transfer operation; and if the adress m is not the last, 1 is added to the address m corresponding to the commodity code (b) (Step 11), and thus the process is returned to Step 4. In this manner, a cycle of Steps 4, 5, 9, 10, 11 and 4 is repeated until the commodity codes (a) and (b) coincide with each other, while adding 1 to the address m each time the cycle is repeated. If, on the contrary, the commodity code (b) is greater than the code (a) (Step 9), a signal "NO" is generated; then it is first examined whether or not the address n is the last (Step 12); if the address n is the last, a signal "YES" is generated to end the transfer operation; and if the address n is not the last, a signal "NO" is generated to add 1 to the address n (Step 13), and thus the process is returned to Step 8. A cycle of Steps 4, 5, 9, 12, 13 and 3 is repeated until the commodity codes (b) and (a) coincide with each other, while adding 1 to the address n every time the cycle is repeated. Accordingly, the transfer operation is not resumed until the commodity codes (a) and (b) coincide with each other, thereby eliminating the occurrence of errors.

Thus, according to the above embodiment of the present invention, the unit price for each commodity can be transferred to the memory 21 by a simple process having the steps of connecting the portable memory unit 31 to the memory interface 22, setting the transfer key 27 to the mode 29 "Transfer," and depressing the start switch 28. Accordingly, if the portable memory unit 31 is connected to the memory interfaces 22 of a number of electronic registers one by one, the unit-price presetting can be performed very rapidly. The transfer operation is not performed unless the transfer key 27 and the start switch 28 are simultaneously operated, and therefore malfunction is prevented; however, the transfer operation may be adapted to be performed by operating the transfer key 27 alone. The transfer key 27 may be of the push-button type, and the mode 29 "Transfer" may be provided on the unit-price setting key 24.

After the transfer operation is completed, the portable memory unit 30 is disconnected from the memory interface 22. If, then, the change-over switch (not shown) is set to "REGISTRATION" and the commodity key 26 is depressed each time when a commodity is sold, the unit price in the memory 21 is read out and thereby the sale proceeds are registered without depressing the ten quantity keys 25. If, thus, the totalling operation for the day is performed, the sale proceeds and quantity for each commodity code (b) are registered in the memory 21.

In the case of commodities stable in price, it is not necessarily required to transfer the unit price to the memory 21 by the use of the portable memory unit 30; the commodity unit-price may be preset in the memory 21 by setting the unit-price setting key 24 to the position W and at the same time depressing the ten quantity keys 25 and commodity key 26 in succession.

Obviously, numerous modifications and variations of the present invention are possible in light of the above teachings. It is therefore to be understood that within the scope of the appended claims, the invention may be practiced otherwise than as specifically described herein.

What is claimed is:

1. A method for presetting unit-price data corresponding to a plurality of commodity codes into a plurality of electronic cash registers, each register provided with a built-in memory for storing said unit-price data and keyboard means for presetting unit-price data into said built-in memory, said keyboard means including commodity keys and numeral keys, comprising:

providing each of said electronic cash registers with a portable memory input/output (I/O) connection and interface means for coupling unit-price data from said keyboard means to said I/O connection and from said I/O connection to said built-in memory;

connecting a portable memory unit to said portable memory I/O connection of at least one cash register;

setting unit-price data into the built-in memory of said at least one cash register and simultaneously in the portable memory unit connected thereto by means of an operation of said keyboard means;

sequentially transferring said portable memory unit from said at least one cash register to the I/O connection of others of said cash registers;

transferring unit-price data from said portable memory for storage in the built-in memory of each of said others of said cash registers when said portable memory is connected to the I/O connection of each of the others of said cash registers;

wherein said others of electronic cash registers to which are connected the electronic cash register portable memory unit for storing the unit-price data for each commodity code are provided with a transfer key such that upon operation of said transfer key the unit-price data in said portable memory unit is transferred therefrom to be stored in the memory of said others of said electronic cash registers.

2. A method for presetting unit-price data corresponding to a plurality of commodity codes into a plurality of electronic cash registers, each register provided with a built-in memory for storing said unit-price data and keyboard means for presetting unit-price data into said built-in memory, said keyboard means including commodity keys and numeral keys, comprising:

providing each of said electronic cash registers with a portable memory input/output (I/O) connection and interface means for coupling unit-price data from said keyboard means to said I/O connection and from said I/O connection to said built-in memory;

connecting a portable memory unit to said portable memory I/O connection of at least one cash register;

setting unit-price data into the built-in memory of said at least one cash register and the portable memory unit connected thereto by means of an operation of said keyboard means;

sequentially transferring said portable memory unit from said at least one cash register to the I/O connection of others of said cash registers;

transferring unit-price data from said portable memory for storage in the built-in memory of each of said others of said cash registers when said portable memory is connected to the I/O connection of each of the others of said cash registers;

wherein, after the unit price data for each commodity code is set in the memory of said at least one of said electronic cash registers, the unit-price data is read automatically from the memory during registration by depressing only commodity keys or commodity keys and numeral keys;

wherein each of said plurality of electronic cash registers is provided with a unit-price setting key so that the unit-price data of commodities stable in price are set in the bulit-in memory, and so that the unit-price data of commodities liable to price change are made to be stored in the memory of each of said plurality of electronic cash registers by the use of said portable memory unit as the occasion demands.

* * * * *